(12) United States Patent
Kitagata et al.

(10) Patent No.: US 12,518,822 B2
(45) Date of Patent: Jan. 6, 2026

(54) SEMICONDUCTOR CHIP INCLUDING SRAM MACROS

(71) Applicant: Renesas Electronics Corporation, Tokyo (JP)

(72) Inventors: Daiki Kitagata, Tokyo (JP); Kouji Satou, Tokyo (JP); Toshiaki Sano, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 125 days.

(21) Appl. No.: 18/513,124

(22) Filed: Nov. 17, 2023

(65) Prior Publication Data

US 2024/0170054 A1    May 23, 2024

(30) Foreign Application Priority Data

Nov. 18, 2022  (JP) .................................. 2022-184613

(51) Int. Cl.
*G11C 11/419* (2006.01)
*G11C 11/412* (2006.01)

(52) U.S. Cl.
CPC .......... *G11C 11/419* (2013.01); *G11C 11/412* (2013.01)

(58) Field of Classification Search
CPC .............................. G11C 11/412; G11C 11/419

USPC ......................................................... 365/154
See application file for complete search history.

(56) References Cited

U.S. PATENT DOCUMENTS

| | | | |
|---|---|---|---|
| 8,514,612 B2 | 8/2013 | Ishii et al. | |
| 10,381,069 B1* | 8/2019 | Dhani Reddy | G11C 7/12 |
| 2017/0194047 A1* | 7/2017 | Rim | G06F 1/3275 |
| 2017/0316820 A1* | 11/2017 | Kumar | G11C 5/147 |
| 2017/0372777 A1* | 12/2017 | Walker | G11C 7/04 |
| 2017/0372794 A1* | 12/2017 | Walker | H10D 30/60 |
| 2018/0012648 A1* | 1/2018 | Ichihashi | G11C 11/419 |
| 2019/0164590 A1* | 5/2019 | Chanana | G11C 11/419 |
| 2019/0221256 A1* | 7/2019 | Kumar | H10B 10/12 |
| 2020/0082875 A1* | 3/2020 | Chou | G11C 11/418 |

FOREIGN PATENT DOCUMENTS

JP    2011-258270 A    12/2011

* cited by examiner

*Primary Examiner* — Sung Il Cho
(74) *Attorney, Agent, or Firm* — Rimon P.C.

(57) ABSTRACT

A plurality of SRAM macros each including a memory cell array, an input/output circuit, a word line driver, and a control circuit are mounted on a semiconductor chip. Each of the SRAM macros includes a determination block disposed in the control circuit and configured to generate a mode signal for determining a read assist amount and a write assist amount based on a power supply voltage of the SRAM macro, and an assist circuit that performs a read assist operation and a write assist operation based on the mode signal generated by the determination block.

5 Claims, 16 Drawing Sheets

| state | | Q1 | Q2 | MSB |
|---|---|---|---|---|
| ① | STANDBY | 0 | 0 | 0 |
| ② VOLTAGE DETERMINATION | Q1 REACHES EARLIER | 1 | 0 | 1 |
| | Q2 REACHES EARLIER | 0 | 1 | 0 |
| ③ | AFTER DETERMINATION | 1 | 1 | LT |

※0.6V, -40℃

SEMICONDUCTOR CHIP INCLUDING SRAM MACROS

CROSS-REFERENCE TO RELATED APPLICATIONS

The disclosure of Japanese Patent Application No. 2022-184613 filed on Nov. 18, 2022 including the specification, drawings and abstract is incorporated herein by reference in its entirety.

BACKGROUND

The present invention relates to a semiconductor chip.

In recent years, demand for smart mobile devices and wearable devices has increased rapidly, and it is required to reduce power consumption of these devices. It is known that the power consumption of a device can be efficiently reduced by reducing a voltage of a semiconductor chip.

There is disclosed a technique listed below.

[Patent Document 1] Japanese Unexamined Patent Application Publication No. 2011/258270

A large number of static random access memories (SRAMs) are mounted on the semiconductor chip. It is difficult to operate the SRAMs at a low voltage due to variations in characteristics of the SRAMs. In order to operate the SRAMs at a low voltage, it has been proposed to perform read assist or write assist (see, for example, Patent Document 1).

SUMMARY

A read assist amount and a write assist amount are often designed to be proportional to a power supply voltage. On the other hand, it is known that when the power supply voltage of the SRAMs is lowered, a required read assist amount and a required write assist amount increase. Therefore, when the power supply voltage of the SRAMs is changed by dynamic control (Dynamic Voltage and Frequency Scaling (DVFS)), since a read assist amount and a write assist amount in a state in which the power supply voltage is in a high voltage range are excessive, there is a problem that power loss at the time of writing increases, a reading rate decreases, and the risk of data destruction in an unselected cell at the time of writing increases.

Other problems and novel features will become apparent from the description of the present specification and the accompanying drawings.

According to an embodiment, a semiconductor chip is a semiconductor chip on which a plurality of static random access memory (SRAM) macros each including a memory cell array, an input/output circuit, a word line driver, and a control circuit are mounted, and each of the SRAM macros includes a determination block disposed in the control circuit and configured to generate a mode signal for determining a read assist amount and a write assist amount based on a power supply voltage of the SRAM macro; and an assist circuit configured to perform a read assist operation and a write assist operation based on the mode signal generated by the determination block.

According to the embodiment, when a power supply voltage of an SRAM is dynamically controlled, an increase in power loss can be prevented, a decrease in speed can be prevented, and a risk of data destruction can be reduced.

DETAILED DESCRIPTION

Figure 1:
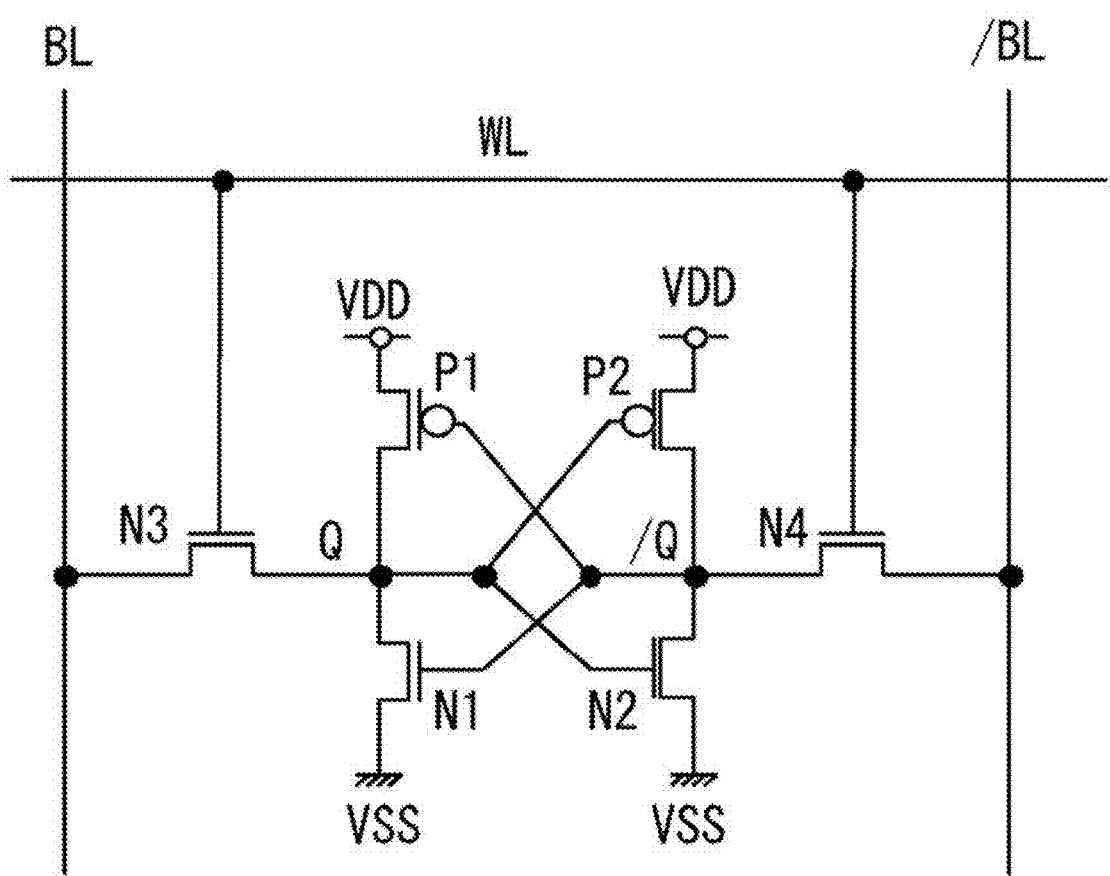
FIG. 1 is a diagram illustrating a configuration of a memory cell array.

For clarity of description, omissions and simplifications are made in the following description and drawings as appropriate. Furthermore, each t described in the drawings as a functional block that performs various processes can be configured by a CPU, a memory, and other circuits in terms of hardware, and is implemented by a program loaded in the memory or the like in terms of software. Therefore, it is understood by those skilled in the art that these functional blocks can be implemented in various forms by only hardware, only software, or a combination thereof, and the functional blocks are not limited to any of them. In the drawings, the same elements are denoted by the same reference signs, and redundant description is omitted as necessary.

The above-described program includes a command group (or software code) for causing a computer to perform one or more of functions described in embodiments when being read by the computer. The program may be stored in a non-transitory computer-readable medium or a tangible storage medium. By way of example, and not limitation, the computer-readable medium or the tangible storage medium includes a random-access memory (RAM), a read-only memory (ROM), a flash memory, a solid-state drive (SSD), or other memory technology, a CD-ROM, a digital versatile disc (DVD), a Blu-ray (registered trademark) disc, or other optical disc storage, or a magnetic cassette, magnetic tape, magnetic disk storage, or another magnetic storage device. The program may be transmitted on a transitory computer readable medium or a communication medium. By way of example, and not limitation, the transitory computer-readable medium or the communication medium includes an electrical, optical, or acoustic propagated signal, or a propagated signal in another form.

(Circumstances Leading to Embodiments)

Figure 2:
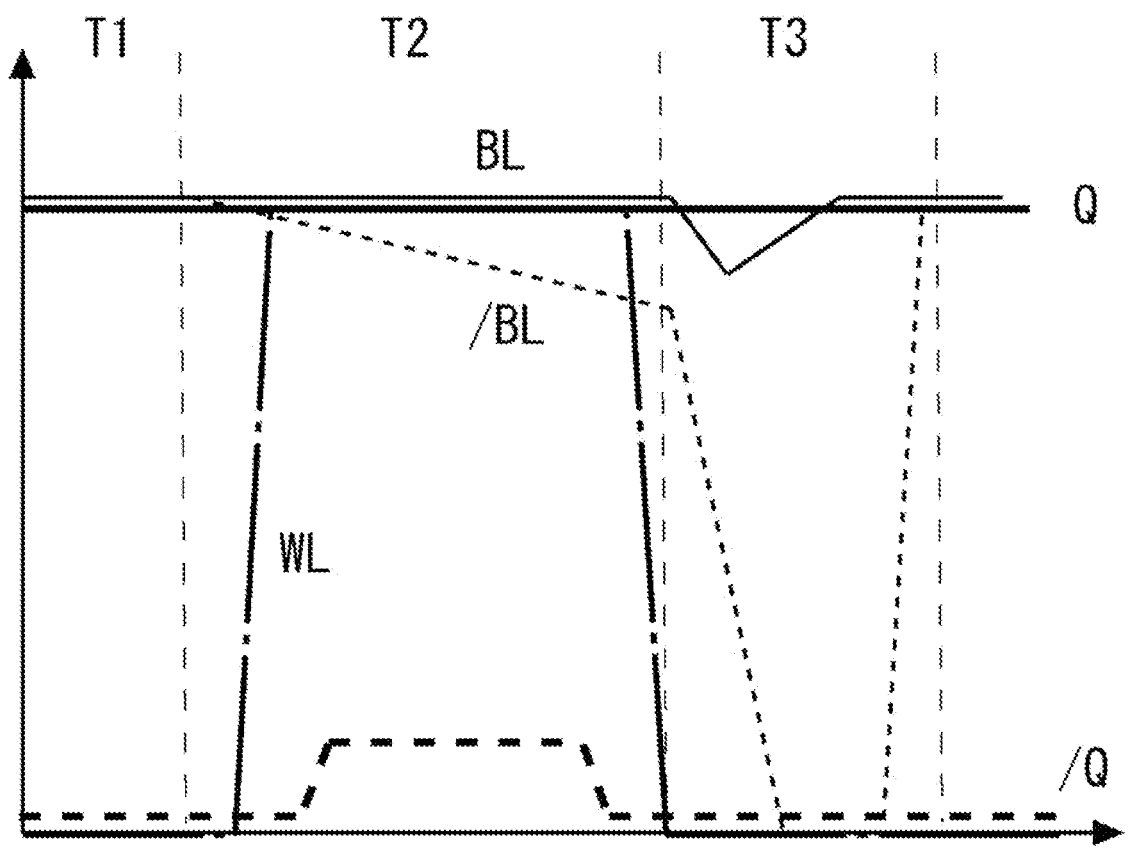
FIG. 2 is a diagram for explaining a read operation of the memory cell array.
Figure 3:
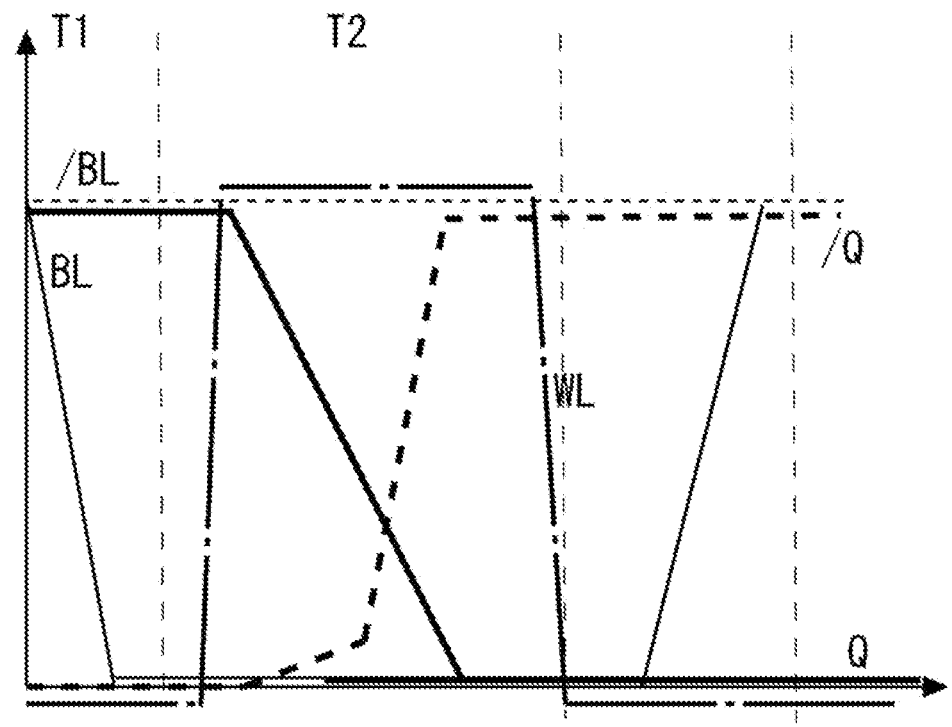
FIG. 3 is a diagram for explaining a write operation to the memory cell array.
Figure 4:
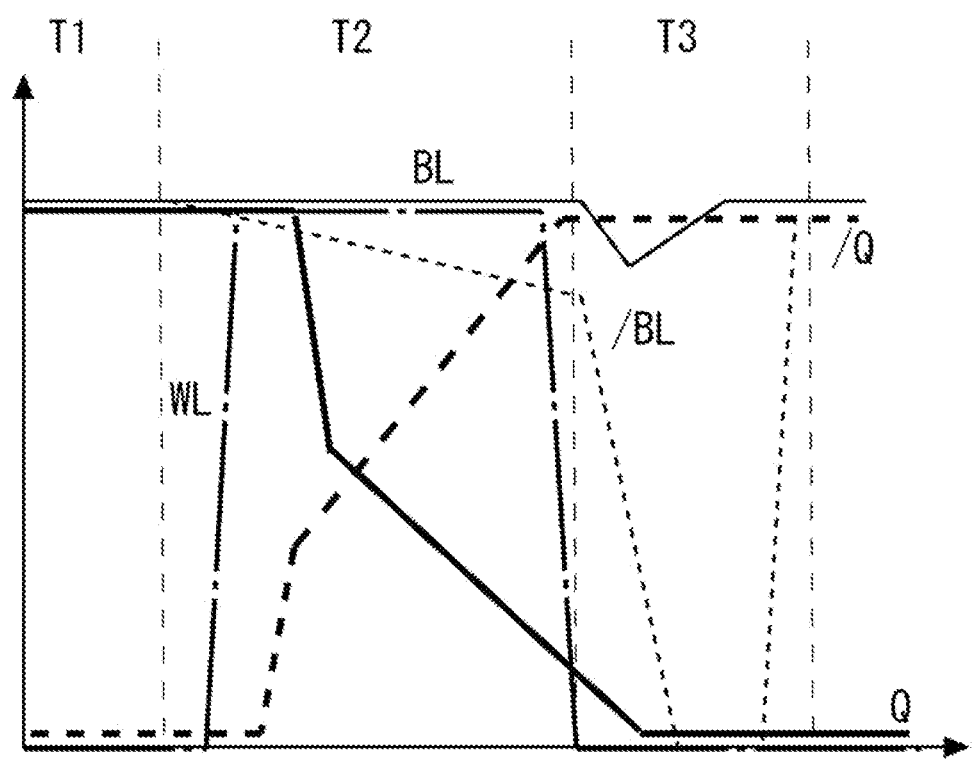
FIG. 4 is a diagram for explaining read disturb.
Figure 5:
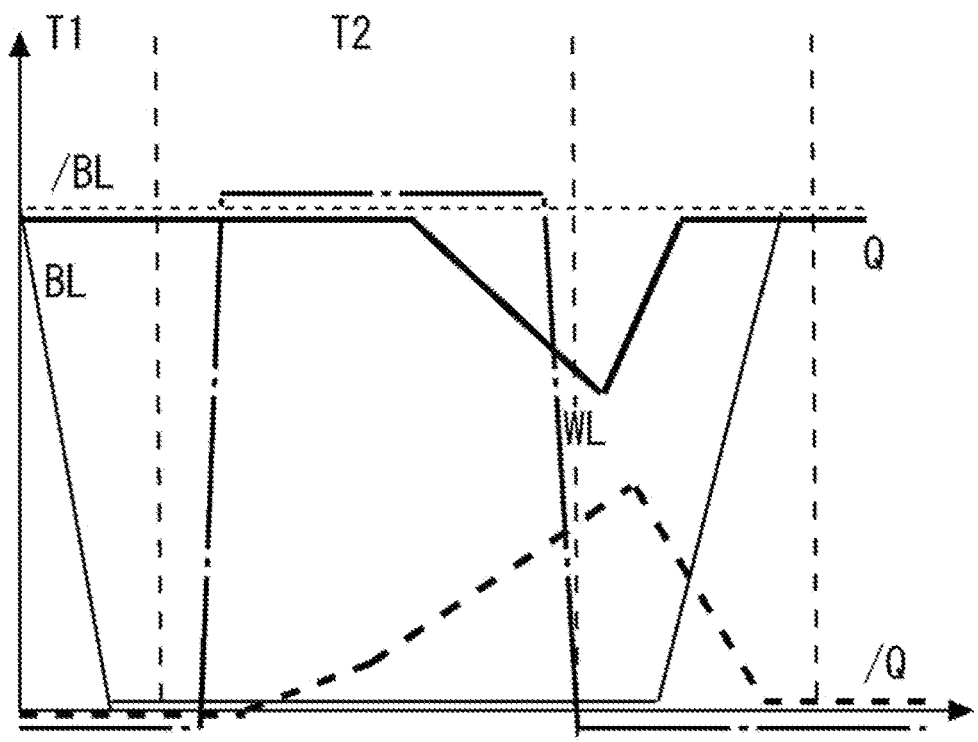
FIG. 5 is a diagram for explaining write disturb.
Figure 6:
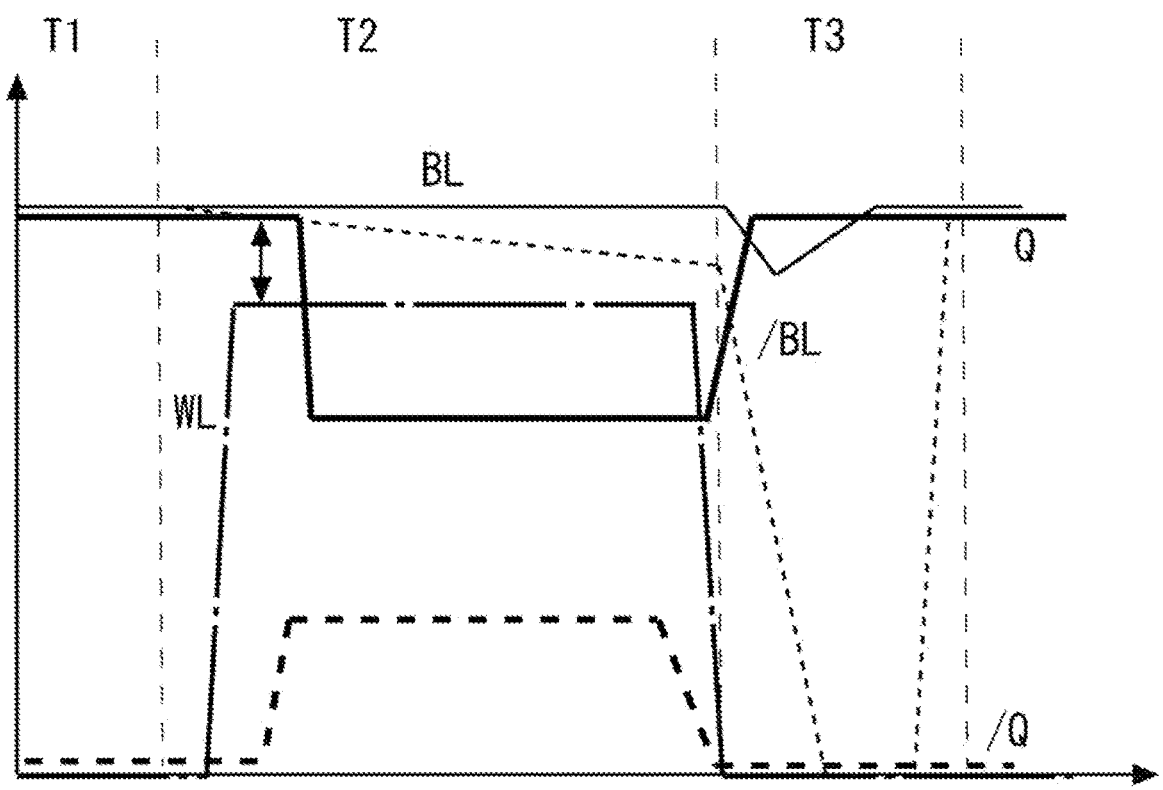
FIG. 6 is a diagram for explaining read assist.
Figure 7:
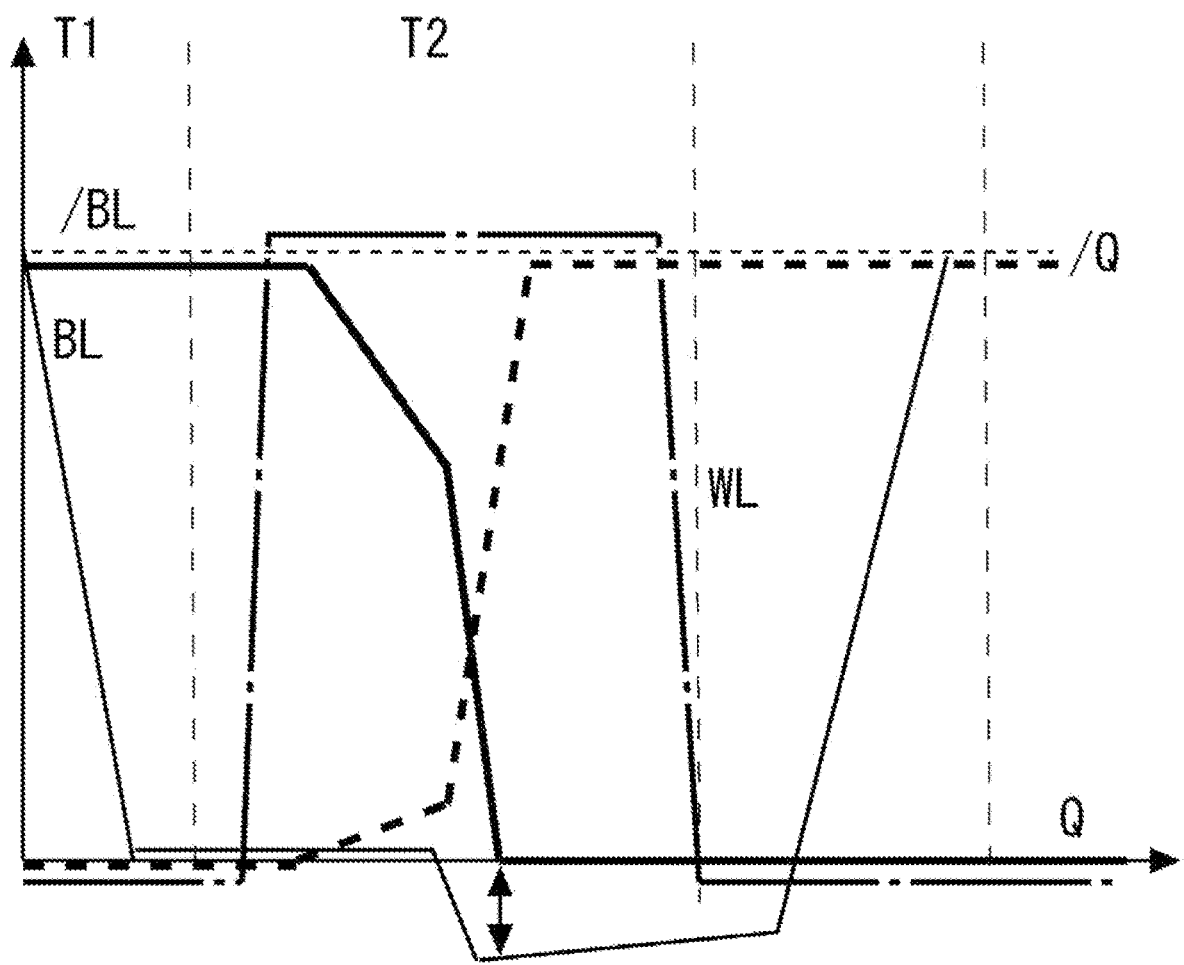
FIG. 7 is a diagram for explaining write assist.

First, an assist operation of a general SRAM will be described with reference to FIGS. 1 to 7. FIG. 1 is a diagram illustrating a configuration of a memory cell array included in the SRAM. FIGS. 2 and 3 are diagrams for explaining a read operation and a write operation of the memory cell array, respectively. FIGS. 4 and 5 are diagrams for explaining read disturb and write disturb, respectively. FIGS. 6 and 7 are diagrams for explaining read assist and write assist, respectively.

Referring to FIG. 1, the memory cell array 10 includes pMOS transistors P1 to P2, nMOS transistors N1 to N4, a pair of bit lines BL and /BL, and a word line WL. The pMOS transistor P1 and the nMOS transistor N1 are connected in series between a power supply potential VDD and a ground potential VSS. A connection node between the pMOS transistor P1 and the nMOS transistor N1 is referred to as a storage node Q. The pMOS transistor P2 and the nMOS transistor N2 are connected in series between the power supply potential VDD and the ground potential VSS. A connection node between the pMOS transistor P2 and the nMOS transistor N2 is referred to as a storage node /Q. The gate of the pMOS transistor P1 and the gate of the nMOS transistor N1 are connected to each other and connected to the storage node /Q. The gate of the pMOS transistor P2 and the gate of the nMOS transistor N2 are connected to each other and connected to the storage node Q.

The nMOS transistors N3 and N4 are also referred to as pass gate transistors. The source and the drain of the nMOS transistor N3 are connected to the bit line BL and the storage node Q. The source and the drain of the nMOS transistor N4 are connected to the bit line /BL and the storage node /Q. The gate of the nMOS transistor N3 and the gate of the nMOS transistor N4 are connected to the word line WL.

FIG. 2 is a diagram for explaining a read operation of the memory cell array 10. FIG. 2 illustrates a period T1, a period T2, and a period T3. The potential of the storage node Q is represented by a thick solid line. The potential of the storage node /Q is represented by a thick dotted line. The potential of the bit line BL is represented by a solid line. The potential of the bit line /BL is represented by a dotted line. The potential of the word line is represented by an alternate long and short dashed line.

It is assumed that the storage nodes Q and /Q are held at an H level and an L level, respectively, in the period T1. The bit lines BL and /BL are floated at the H level. Hereinafter, the L level may be represented as "0", and the H level may be represented as "1".

In the period T2, when the word line WL is set to the H level, the nMOS transistors N3 and N4 become conductive. Then, the potential of the storage node Q and the potential of the storage node /Q are read to the bit lines BL and /BL. The potential of the bit line /BL slightly decreases, and the potential of the storage node /Q slightly increases.

In the period T3, a difference between the potential of the bit line BL and the potential of the bit line /BL is amplified by a sense amplifier (not illustrated). As a result, data stored in the memory cell array 10 is read. The bit lines BL and /BL are set to the H level again.

FIG. 3 is a diagram for explaining a write operation to the memory cell array 10. FIG. 3 illustrates a period T1 and a period T2.

It is assumed that the storage nodes Q and /Q are held at the H level and the L level, respectively, in the period T1. In the period T1, as preparation for write data, the bit line BL is set to the L level, and the bit line /BL is set to the H level.

In the period T2, when the word line WL is set to the H level, the potential of the storage node Q decreases and the potential of the storage node /Q increases. Then, data stored in the storage nodes Q and /Q is flipped, the storage node Q becomes the L level, and the storage node /Q becomes the H level. After the period T2, the bit line BL is set to the H level again.

FIG. 4 is a diagram for explaining read disturb. Due to local variations, the deviation of the threshold voltage of the nMOS transistor N2 and the deviation of the threshold voltage of the nMOS transistor N4 may be large. In this case, an increase in the potential of the storage node /Q in the period T2 is large. The potential of the storage node Q also decreases, and data flipping occurs between the storage nodes Q and /Q. The storage node Q becomes the L level, and the storage node /Q becomes the H level.

FIG. 5 is a diagram for explaining write disturb. Due to local variations, the deviation of the threshold voltage of the pMOS transistor P2 may be large, and the deviation of the threshold voltage of the nMOS transistor N3 may be large. In this case, in the period T2, the decrease rate of the potential of the storage node Q is low, and the increase rate of the potential of the storage node /Q is low. In this case, writing is not completed in the period T2, and a writing error occurs.

FIG. 6 is a diagram for explaining read assist. When the read assist is performed, the word line W is driven at a potential lower than the H level. This read assist method is also referred to as word line under drive (WLUD). In this case, the read disturb can be prevented by suppressing an increase in the potential of the storage node /Q in the period T2. The difference between the potential of the word line and the H level in the period T2 is referred to as a read assist amount. A double-headed arrow illustrated in FIG. 6 indicates the read assist amount. The read assist amount is often designed to be proportional to the power supply voltage.

FIG. 7 is a diagram for explaining write assist. In the period T2, the bit line BL is driven at a potential lower than the L level. This write assist method is also referred to as negative BL. In this case, the writing can be completed in the period T2. The difference between the potential of the bit line BL and the L level is referred to as a write assist amount. A double-headed arrow illustrated in FIG. 7 indicates the write assist amount. The write assist amount is often designed to be proportional to the power supply voltage. Hereinafter, in a case where the read assist amount and the write assist amount are not distinguished from each other, each of the read assist amount and the write assist amount may be simply referred to as an assist amount.

Next, problems found by the inventors regarding the read assist and the write assist will be described. The assist amount is often designed to be proportional to the power supply voltage. On the other hand, it is known that the required assist amount is larger as the power supply voltage is lower. In a case where the power supply voltage is dynamically controlled, it is necessary to set a ratio of the assist amount to the power supply voltage to be high in order to secure the required assist amount in a state in which the power supply voltage is in a low voltage range.

Figure 8:
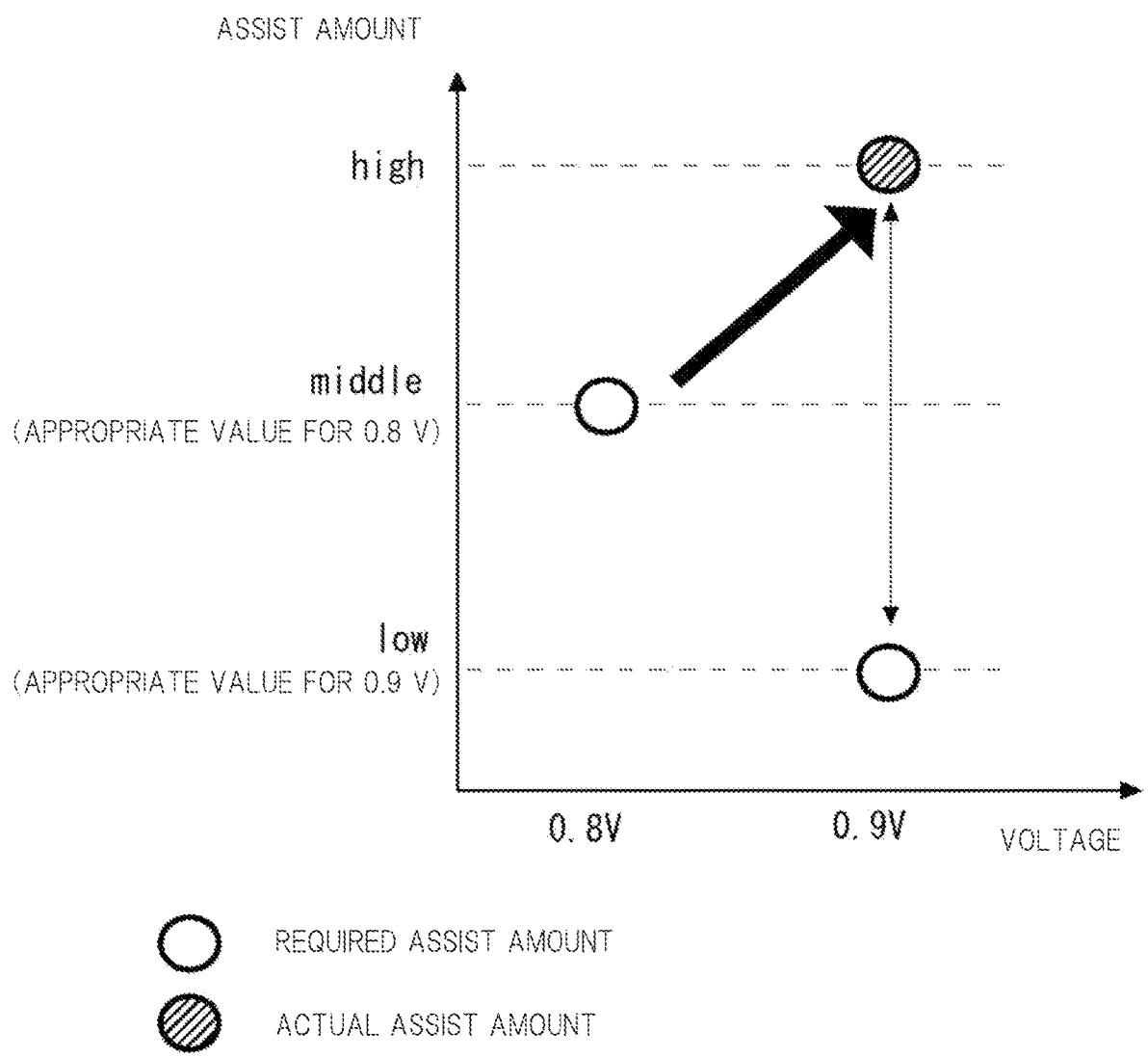
FIG. 8 is a graph illustrating a relationship between a required assist amount and an actual assist amount.

In this case, the difference between the actual assist amount and the required assist amount increases in a state in which the power supply voltage is in a high voltage range. FIG. 8 is a graph illustrating a relationship between the required assist amount and the actual assist amount. The vertical axis represents the assist amount, and the horizontal axis represents the voltage. It is assumed that the assist amount when the voltage is 0.8 V is "middle". As described above, when the voltage is 0.9 V, the required assist amount is smaller than the "middle" amount, and is "low". However, according to the related art, the assist amount when the voltage is 0.9 V is larger than the "middle" amount, and the actual assist amount is "high". Therefore, when the voltage is 0.9 V, a power loss corresponding to the difference between "high" and "low" occurs. In addition, a decrease in speed occurs by making the assist amount larger than necessary. According to the calculation, a power loss of 30% at maximum occurs, and a 40% decrease in speed at maximum occurs. In addition, the risk of destroying unselected data increases. Conventionally, since a voltage range used for DVFS is narrow, the voltage range can be handled by design. However, when the voltage range used for the DVFS increases, it becomes difficult to handle the voltage range by design.

Meanwhile, in order to solve the above-described problem, it is conceivable to switch modes between the high voltage range (for example, 0.9 V) and the low voltage range (for example, 0.8 V). In this case, since it is necessary to supply a mode signal to each SRAM macro, the following disadvantages occur.

Figure 9:
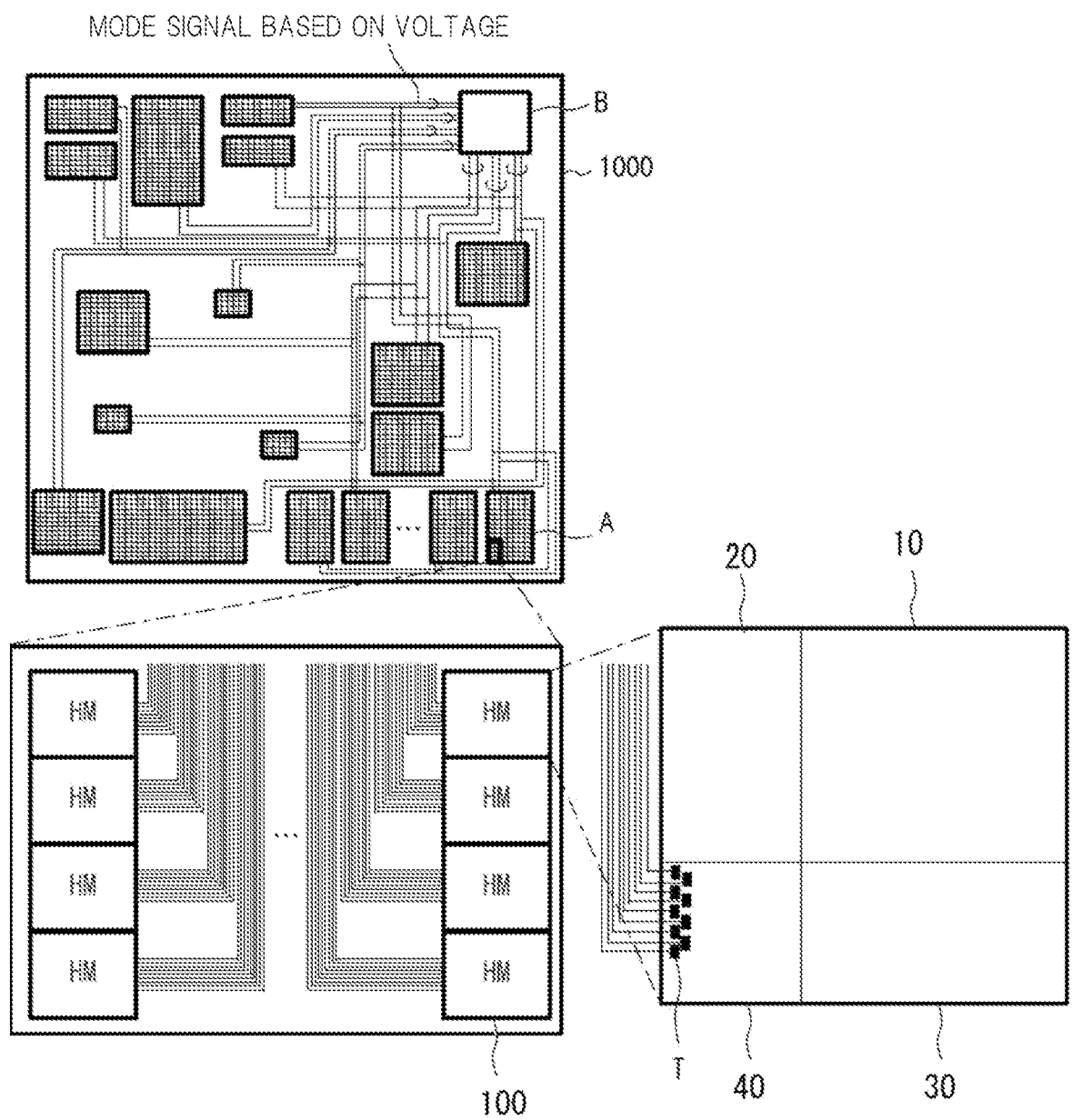
FIG. 9 is a diagram illustrating wirings necessary for supplying a mode signal.

Referring to FIG. 9, integration regions A of the SRAM macros are scattered on a semiconductor chip 1000. Memory cell types are different between the integration regions A. A symbol B represents a mode signal generation circuit. In this case, it is necessary to supply a mode signal based on the power supply voltage to each integration region A. For example, about nine mode lines are supplied to each SRAM. In this case, there is a problem that the design of the semiconductor chip becomes complex and the wiring cost increases.

In addition, a plurality of SRAM macros 100 are present in each of the integration regions A of the SRAM macros. The SRAM macros 100 are also referred to as hard macros (HMs). Each of the SRAM macros 100 includes a memory cell array 10, an input/output circuit 20, a word line driver 30, and a control circuit 40. The control circuit 40 includes a plurality of terminals T to which a mode signal is input. Therefore, there is also a problem that the wiring cost for connecting terminals T in each integration region A increases.

Meanwhile, it is also conceivable to provide a voltage monitor in each SRAM macro. For example, there is known a circuit that monitors a power supply voltage by counting an output of an oscillator with a counter using the oscillator whose frequency changes in accordance with the power supply voltage. However, since the circuit scale of this circuit is 10 times or more that of each SRAM macro, there is a problem that only about 4 circuits can be mounted on the semiconductor chip 1000, and it is extremely difficult to mount a large number of circuits in all the large number (for example, several 1000 or more) of SRAM macros mounted on the chip.

The inventors of the present application have conceived embodiments based on the above consideration. Hereinafter, the embodiments will be described.

First Embodiment

Figure 10:
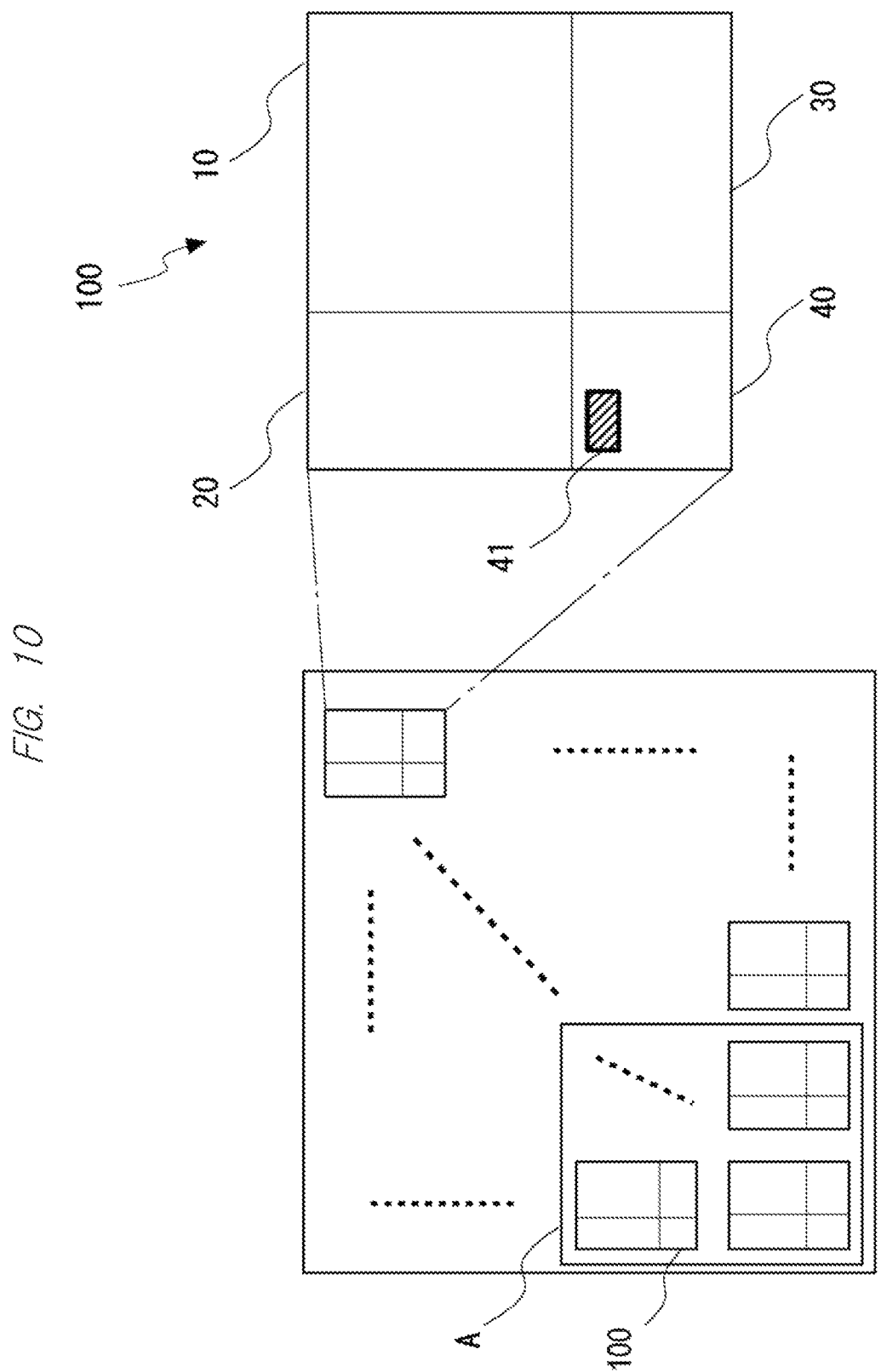
FIG. 10 is a diagram illustrating a configuration of a semiconductor chip according to a first embodiment.

FIG. 10 is a diagram illustrating a configuration of a semiconductor chip 1000 according to a first embodiment. The semiconductor chip 1000 includes a plurality of SRAM macros 100. A symbol A represents an integration region of SRAM macros 100.

Each of the SRAM macros 100 includes a memory cell array 10, an input/output circuit 20, a word line driver 30, and a control circuit 40.

Since the configuration of the memory cell array 10 is similar to that in FIG. 1, the description thereof will be omitted.

The input/output circuit 20 is a circuit that performs reading and writing on a pair of bit lines BL and /BL. The input/output circuit 20 includes a sense amplifier (not illustrated) and a write circuit for supplying write data to the memory cell array 10. In addition, the input/output circuit 20 includes an assist circuit (not illustrated) for performing read assist and write assist. Note that the assist circuit may be disposed outside the input/output circuit 20.

The word line driver 30 is a circuit that drives a word line WL. In addition, the word line driver 30 includes a decoder circuit that decodes an address signal and selects a word line.

The control circuit 40 is a circuit that controls reading of data from the memory cell array 10 and writing of data to the memory cell array 10.

In the control circuit 40, a determination block 41 is disposed. The determination block 41 generates a mode signal for determining an assist amount, based on a power supply voltage of the SRAM macro 100. The determination block 41 supplies the mode signal to the assist circuit (not illustrated) included in the input/output circuit 20 or the like.

The size of the SRAM macro 100 is determined based on the size of the input/output circuit 20 and the size of the word line driver 30. Therefore, the control circuit 40 often has a relatively large area margin, and an increase in the size of the SRAM macro 100 can be prevented by arranging the determination block 41 in the control circuit 40. The amount of increase in the size of the SRAM macro 100 is ideally 0.

Figure 11:
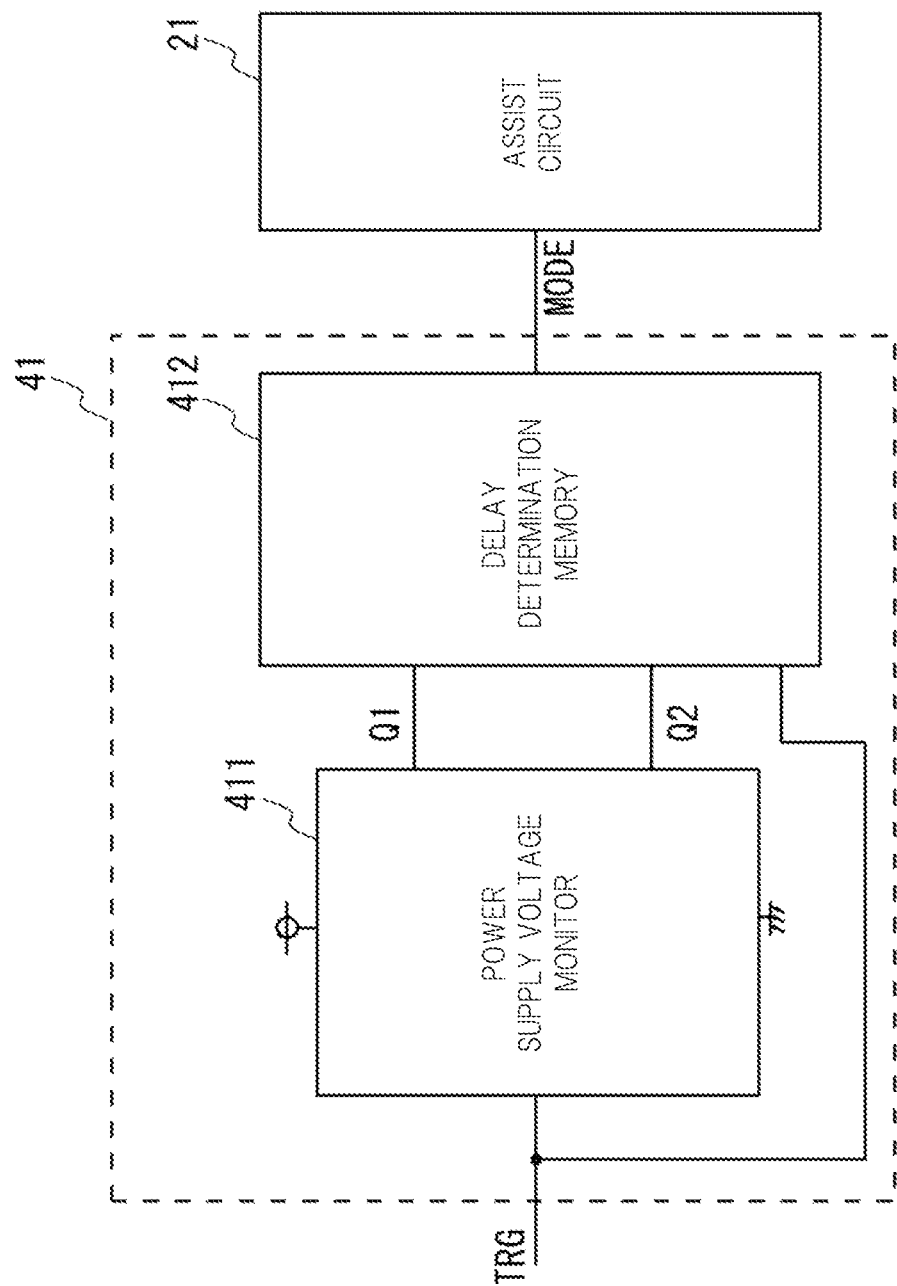
FIG. 11 is a diagram illustrating a configuration of a determination block according to the first embodiment.

FIG. 11 is a diagram illustrating a configuration of the determination block 41. The determination block 41 includes a power supply voltage monitor 411 and a delay determination memory 412. The delay determination memory 412 is also referred to as a flip-flop with a delay determination function. The delay determination memory 412 is also referred to as a first delay determination memory.

A trigger signal TRG is input to the power supply voltage monitor 411. The trigger signal TRG is, for example, a pulse signal whose period is constant, and a signal already supplied to the SRAM macro 100 can be used as the trigger signal TRG. The power supply voltage is supplied to the power supply voltage monitor 411. The power supply voltage monitor 411 includes two delay circuits and outputs delay signals Q1 and Q2. Each of the delay signal Q1 and the delay signal Q2 is a signal obtained by delaying the trigger signal TRG. In a case where the power supply voltage of the SRAM macro 100 is larger than a predetermined voltage, the delay amount of the delay signal Q1 is larger than the delay amount of the delay signal Q2. In a case where the power supply voltage of the SRAM macro 100 is smaller than the predetermined voltage, the delay amount of the delay signal Q1 is smaller than the delay amount of the delay signal Q2. The delay signals Q1 and 02 are input to the delay determination memory 412.

The delay determination memory 412 determines a magnitude relationship between the delay amount of the delay signal Q1 and the delay amount of the delay signal Q2. The delay determination memory 412 generates a mode signal MODE based on a result of the determination and holds the mode signal MODE. The mode signal MODE is input to the assist circuit 21 included in the input/output circuit 20 or the like.

The assist circuit 21 performs a read assist operation and a write assist operation based on the mode signal generated by the determination block 41. In a case where the delay amount of the delay signal Q1 is larger than the delay amount of the delay signal Q2, the power supply voltage is higher than the predetermined voltage. In this case, the assist circuit 21 performs the assist operations with a small assist amount. On the other hand, in a case where the delay amount of the delay signal Q1 is smaller than the delay amount of the delay signal Q2, the power supply voltage is lower than the predetermined voltage. In this case, the assist circuit 21 performs the assist operations with a large assist amount.

Figure 12:
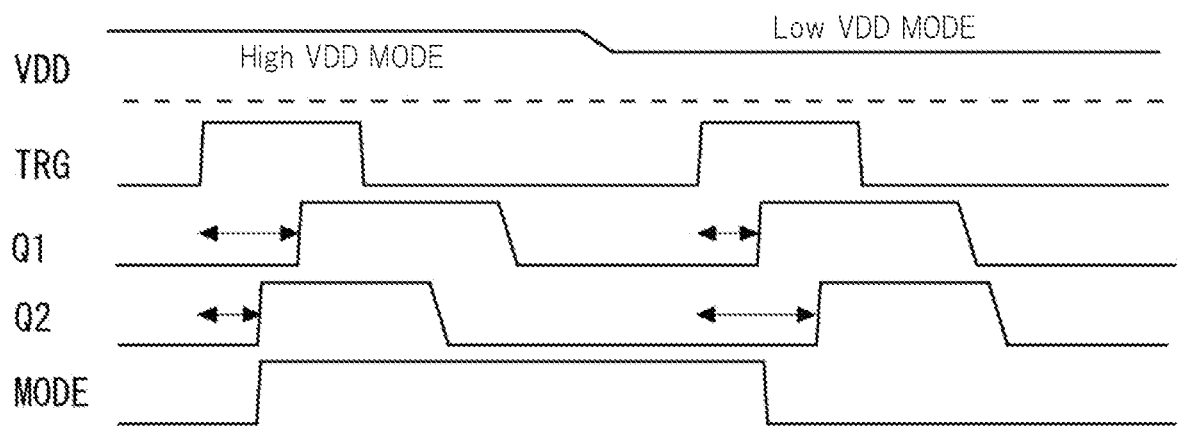
FIG. 12 is a diagram for explaining an operation of the determination block.

FIG. 12 is a diagram for explaining an operation of the determination block 41. In a case where the mode signal MODE is at the H level, a mode in which the assist amount is small is set. In a case where the mode signal is at the L level, a mode in which the assist amount is large is set.

First, a case where the semiconductor chip 1000 operates in a high VDD mode and the power supply potential VDD is set high will be described. When the trigger signal TRG is input to the power supply voltage monitor 411, the power supply voltage monitor 411 outputs the delay signals Q1 and Q2 obtained by delaying the trigger signal TRG. The delay amount of the delay signal Q1 is larger than the delay amount of the delay signal Q2. Since the delay amount of the delay signal Q1 is larger than the delay amount of the delay signal Q2, the delay determination memory 412 changes the mode signal to the H level.

Next, a case where the semiconductor chip 1000 operates in a low VDD mode and the power supply potential VDD is set low will be described. When the trigger signal TRG is input to the power supply voltage monitor 411, the power supply voltage monitor 411 outputs the delay signals Q1 and Q2 obtained by delaying the trigger signal TRG. The delay amount of the delay signal Q1 is smaller than the delay amount of the delay signal Q2. Since the delay amount of the delay signal Q1 is smaller than the delay amount of the delay signal Q2, the delay determination memory 412 changes the level of the mode signal to the L level.

Figure 13:
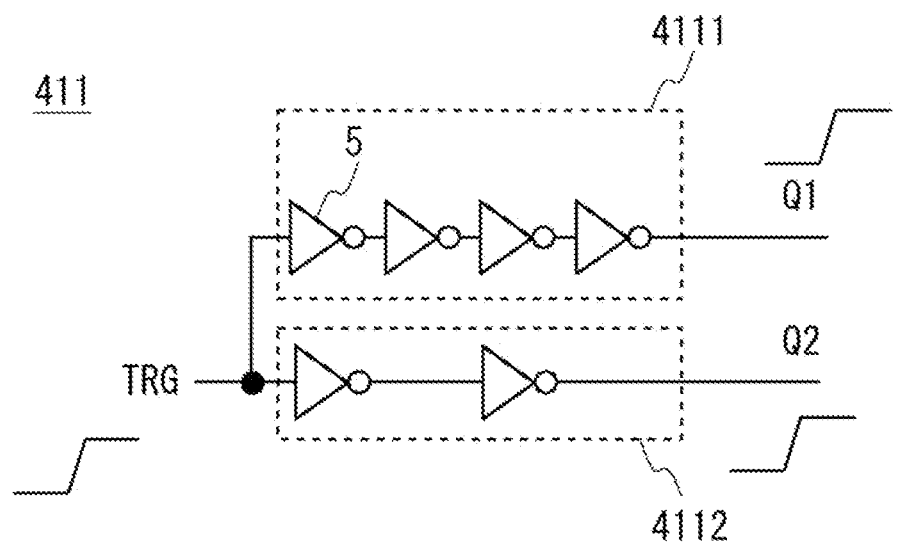
FIG. 13 is a diagram illustrating a configuration of a voltage monitor according to the first embodiment.

FIG. 13 is a diagram illustrating a configuration of the power supply voltage monitor 411. The power supply voltage monitor 411 includes a delay circuit 4111 and a delay circuit 4112. The delay circuit 4111 is also referred to as a first delay circuit. The delay circuit 4112 is also referred to as a second delay circuit.

Each of the delay circuit 4111 and the delay circuit 4112 includes NOT circuits 5 at even-numbered stages. Each of the NOT circuits 5 may include a NAND gate or a NOR gate. In addition, the phase of the trigger signal TRG may be reversed, and the numbers of stages may be set to an odd number.

The number of stages (for example, 4 stages) of the NOT circuits 5 included in the delay circuit 4111 is larger than the number of stages (for example, 2 stages) of the NOT circuits 5 included in the delay circuit 4112.

A threshold voltage of a transistor forming the delay circuit 4111 is lower than a threshold voltage of a transistor forming the delay circuit 4112. For example, the delay circuit 4111 includes a transistor having a standard threshold voltage (SVT), and the delay circuit 4112 includes a transistor having a high threshold voltage (HVT). Each transistor operates at the power supply potential VDD supplied to the SRAM macro 100.

The delay circuit 4111 outputs the delay signal Q1 obtained by delaying the trigger signal TRG. The delay circuit 4112 outputs the delay signal Q2 obtained by delaying the trigger signal TRG. The delay amount of the delay signal Q1 is also referred to as a delay amount in the delay circuit 4111. The delay amount of the delay signal Q2 is also referred to as a delay amount in the delay circuit 4112.

Figure 14:
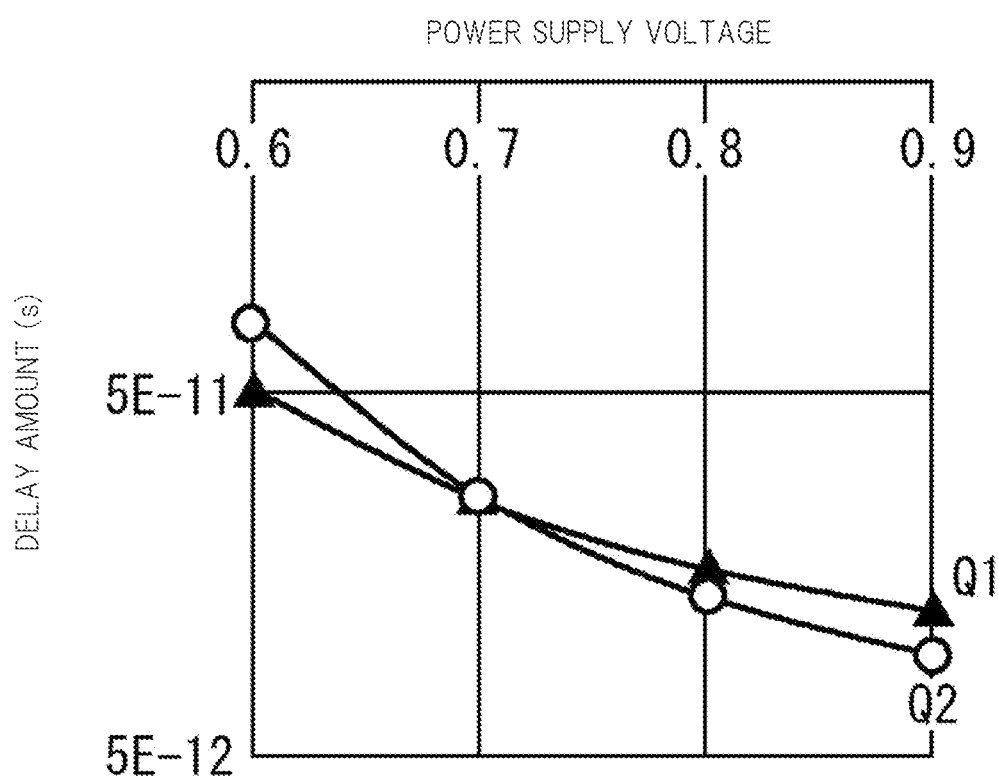
FIG. 14 is a diagram illustrating a relationship between delay amounts and a power supply voltage.

FIG. 14 is a graph illustrating a relationship between the delay amount of the delay signal Q1 and the delay amount of the delay signal Q2, and the power supply voltage. The graph shows the results of simulations performed by the inventors.

The vertical axis represents the delay amount(s), and the delay amount is larger toward the upper side. The horizontal axis represents the power supply voltage, and the power supply voltage is higher toward the right side. The delay amount of the delay signal Q1 is represented by triangular symbols, and the delay amount of the delay signal Q2 is represented by circular symbols.

When the power supply voltage is high, the delay amount (delay amount of the delay signal Q1) in the delay circuit 4111 having a larger number of stages of the NOT circuits 5 is larger. As the power supply voltage decreases, the delay amount in the transistor having the high threshold voltage rapidly increases, so that the delay amount in the delay circuit 4112 (delay amount of the delay signal Q2) becomes larger. That is, the number of stages is dominant in a case where the power supply voltage is in the high voltage range, and a decrease in the driving force of the transistor is dominant in a case where the power supply voltage is in the low voltage range.

A cross point of a curve representing the delay amount of the delay signal Q1 and a curve representing the delay amount of the delay signal Q2 can be freely designed based on the numbers of stages of the NOT circuits 5 and the threshold voltages of the transistors. Furthermore, the position of the cross point may be adjusted by making the ratio (W/L) of the channel width (W) and the channel length (L) of the transistor forming the delay circuit 4111 different from the ratio (W/L) of the channel width (W) and the channel length (L) of the transistor forming the delay circuit 4112.

Note that it is known that an element (for example, global variation) that affects both a delay path of the delay circuit 4111 and a delay path of the delay circuit 4112 has a small effect on the position of the cross point. This effect can thus be addressed by design.

Figure 15:
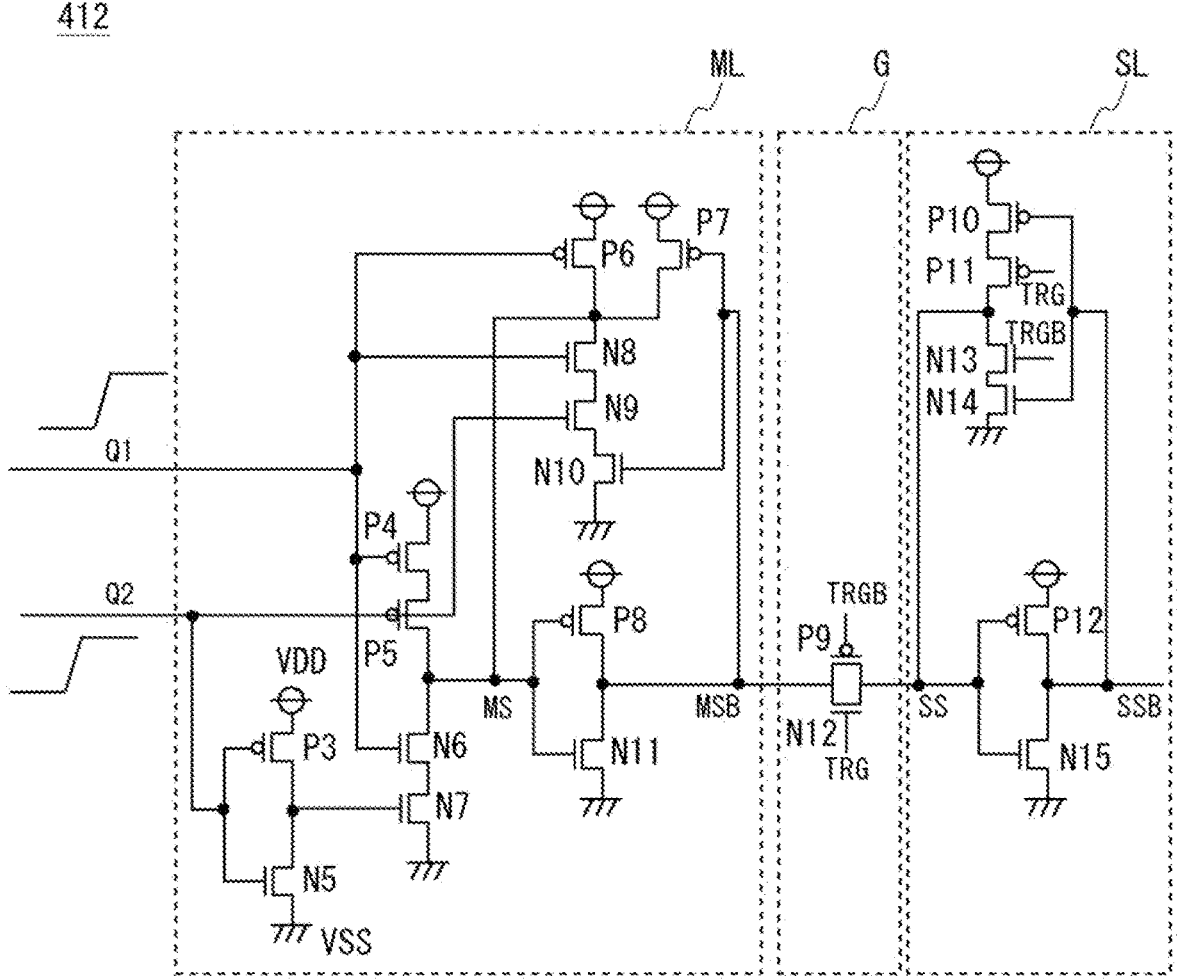
FIG. 15 is a diagram illustrating a configuration of a delay determination memory according to the first embodiment.

FIG. 15 is a diagram illustrating a configuration of the delay determination memory 412. The delay determination memory 412 includes a master latch ML, a transfer gate G, and a slave latch SL.

The master latch ML includes nMOS transistors N5 to N11 and pMOS transistors P3 to P8.

The pMOS transistor P3 and the nMOS transistor N5 are connected in series between the power supply potential VDD and the ground potential VSS. A node connecting the pMOS transistor P3 and the nMOS transistor N5 is connected to the gate of the nMOS transistor N7.

The pMOS transistor P4, the pMOS transistor P5, the nMOS transistor N6, and the nMOS transistor N7 are connected in series between the power supply potential VDD and the ground potential VSS. A connection node between the pMOS transistor P5 and the nMOS transistor N6 is referred to as a storage node MS.

The pMOS transistor P6, the nMOS transistor N8, the nMOS transistor N9, and the nMOS transistor N10 are connected in series between the power supply potential VDD and the ground potential VSS. A connection node between the pMOS transistor P6 and the nMOS transistor N8 is connected to the storage node MS. The source and the drain of the pMOS transistor P7 are connected to the power supply potential VDD and the storage node MS.

The pMOS transistor P8 and the nMOS transistor N11 are connected in series between the power supply potential VDD and the ground potential VSS. The gate of the pMOS transistor P8 and the gate of the nMOS transistor N11 are connected to each other and connected to the storage node MS. A connection node between the pMOS transistor P7 and the nMOS transistor N11 is referred to as a storage node MSB.

The gate of the pMOS transistor P6, the gate of the nMOS transistor N8, the gate of the pMOS transistor P4, and the gate of the nMOS transistor N6 are connected to each other, and the delay signal Q1 is input to the gate of the pMOS transistor P6, the gate of the nMOS transistor N8, the gate of the pMOS transistor P4, and the gate of the nMOS transistor N6. The gate of the pMOS transistor P3, the gate of the nMOS transistor N5, the gate of the pMOS transistor P5, and the gate of the nMOS transistor N9 are connected to each other, and the delay signal Q2 is input to the gate of the pMOS transistor P3, the gate of the nMOS transistor N5, the gate of the pMOS transistor P5, and the gate of the nMOS transistor N9.

The transfer gate G includes an nMOS transistor N12 and a pMOS transistor P9. The source drain of the nMOS transistor N12 is connected to the source drain of the pMOS transistor P9. The transfer gate G is connected to the storage node MSB and a storage node SS to be described later. The trigger signal TRG is input to the gate of the nMOS transistor N12, and a trigger signal TRGB obtained by inverting the trigger signal TRG is input to the gate of the pMOS transistor P9.

The slave latch SL includes nMOS transistors N13 to N15 and pMOS transistors P10 to P12.

The pMOS transistor P10, the pMOS transistor P11, the nMOS transistor N13, and the nMOS transistor N14 are connected in series between the power supply potential VDD and the ground potential VSS. A connection node between the pMOS transistor P11 and the nMOS transistor N13 is referred to as the storage node SS. The gate of the pMOS transistor P10 and the gate of the nMOS transistor N14 are connected to each other and are connected to a storage node SSB to be described later. The trigger signal TRG is input to the gate of the pMOS transistor P11, and the trigger signal TRGB is input to the gate of the nMOS transistor N13.

The pMOS transistor P12 and the nMOS transistor N15 are connected in series between the power supply potential VDD and the ground potential VSS. The gate of the pMOS transistor P12 and the gate of the nMOS transistor N15 are connected to each other and connected to the storage node SS. A connection node between the pMOS transistor P12 and the nMOS transistor N15 is referred to as the storage node SSB. The mode signal MODE may be generated in accordance with the level of the storage node SSB.

Figures 16, 17:
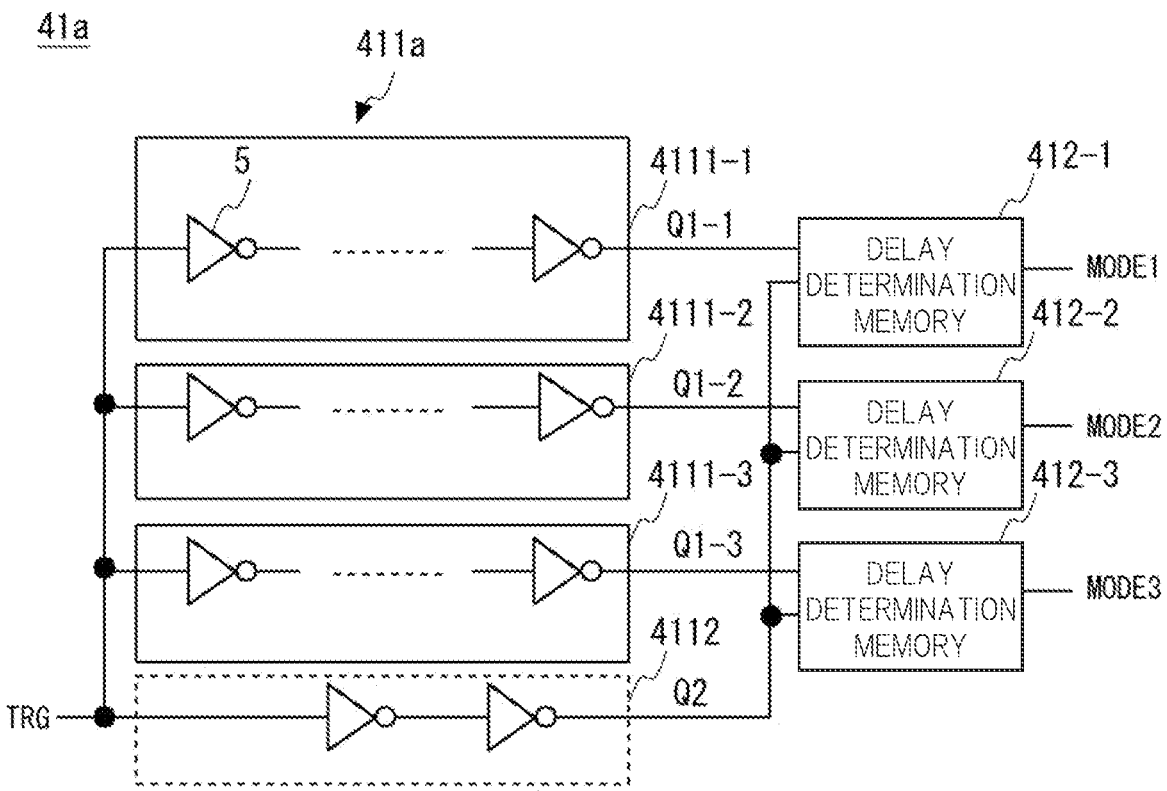
FIG. 16 is a diagram for explaining an operation of the delay determination memory according to the first embodiment.
FIG. 17 is a diagram illustrating a configuration of a determination block according to a second embodiment.

FIG. 16 is a diagram for explaining an operation of the delay determination memory 412. In a standby state that is the initial state, the trigger signal TRG is not input, and the level of the delay signal Q1 and the level of the delay signal Q2 are "0". The pMOS transistor P6 is in a conductive state, the level of the storage node MS is "1", and the level of the storage node MSB is "0". The storage node SSB latches a previous value, and the mode is fixed as it was in the previous determination.

In a case where the delay signal Q1 reaches the delay determination memory 412 earlier than the delay signal Q2, the pMOS transistor P6 becomes non-conductive, and the nMOS transistor N6 becomes conductive. Then, the level of the storage node MS becomes "0", and the level of the storage node MSB becomes "1". When the delay signal Q2 reaches the delay determination memory 412 later than the delay signal Q1, the nMOS transistor N9 becomes conductive. Then, the values of the storage nodes MS and MSB are latched.

When the delay signal Q2 reaches the delay determination memory 412 earlier than the delay signal Q1, the pMOS transistor P6 remains in the conductive state, the level of the storage node MS is "1", and the level of the storage node MSB is "0". When the delay signal Q1 reaches the delay determination memory 412 later than the delay signal Q2, the nMOS transistor N8 becomes conductive. Then, the levels of the storage nodes MS and MSB are latched.

In the standby state in which the level of the trigger signal is "0", the storage node SSB holds the previous value, and the mode is fixed as it was in the previous voltage determination. When the level of the trigger signal is "1", the level held in the storage node MSB changes depending on which of the delay signals Q1 and Q2 reaches the delay determination memory 412 earlier. Then, when the later one of the delay signals Q1 and Q2 reaches the delay determination memory 412, the level of the storage node MSB is latched. The signal to be output is determined based on which of the delay signals Q1 and Q2 reaches the delay determination memory 412 earlier. When the level of the trigger signal TRG is set to "0", the master latch ML returns to the initial state, and the slave latch SL fixes the output. The mode is determined by the slave latch SL.

With the semiconductor chip 1000 according to the first embodiment, the assist amount can be changed in accordance with the power supply voltage. Therefore, it is possible to prevent the power loss from increasing in a state in which the power supply voltage is in the high voltage range, and to reduce the risk of data destruction occurring in a state in which the power supply voltage is in the high voltage range. In addition, it is possible to prevent the speed from decreasing in a state in which the power supply voltage is in the high voltage range. Since the determination block is disposed in each SRAM macro, it is possible to prevent an increase in the number of wires for transmitting a mode signal. Since the size of the voltage monitor is small, the determination block can be disposed in each SRAM macro.

Second Embodiment

A second embodiment is a modification of the first embodiment. In the second embodiment, at least one of the first delay circuit and the second delay circuit includes a plurality of delay circuits having different numbers of stages of NOT circuits. A case where the first delay circuit includes a plurality of delay circuits will be mainly described below.

FIG. 17 is a diagram illustrating a configuration of a determination block 41a according to the second embodiment. The determination block 41a includes a delay circuit 4111-1, a delay circuit 4111-2, a delay circuit 4111-3, a delay circuit 4112, a delay determination memory 412-1, a delay determination memory 412-2, and a delay determination memory 412-3.

The delay circuit 4111-1, the delay circuit 4111-2, and the delay circuit 4111-3 are first delay circuits. The delay circuit 4112 is a second delay circuit.

The delay circuit 4111-1 includes NOT circuits 5 at eight stages, the delay circuit 4111-2 includes NOT circuits 5 at six stages, and the delay circuit 4111-3 includes NOT circuits 5 at four stages. The delay circuit 4112 includes NOT circuits at two stages.

Threshold voltages of transistors forming the delay circuits 4111-1, 4111-2, and 4111-3 are lower than a threshold voltage of a transistor forming the delay circuit 4112. For example, each of the delay circuits 4111-1, 4111-2, and 4111-3 includes a transistor having a low threshold voltage (LVT), and the delay circuit 4112 includes a transistor having a high threshold voltage.

Circuit configurations of the delay determination memories 412-1, 412-2, and 412-3 are similar to that of the delay determination memory 412.

A delay signal Q1-1 output from the delay circuit 4111-1 and a delay signal Q2 output from the delay circuit 4112 are input to the delay determination memory 412-1. The delay determination memory 412-1 generates a mode signal MODE1 based on a magnitude relationship between the delay amount of the delay signal Q1-1 and the delay amount of the delay signal Q2.

A delay signal Q1-2 output from the delay circuit 4111-2 and the delay signal Q2 output from the delay circuit 4112 are input to the delay determination memory 412-2. The delay determination memory 412-2 generates a mode signal MODE2 based on a magnitude relationship between the delay amount of the delay signal Q1-2 and the delay amount of the delay signal Q2.

A delay signal Q1-3 output from the delay circuit 4111-3 and the delay signal Q2 output from the delay circuit 4112 are input to the delay determination memory 412-3. The delay determination memory 412-3 generates a mode signal MODE3 based on a magnitude relationship between the delay amount of the delay signal Q1-3 and the delay amount of the delay signal Q2.

Figure 18:
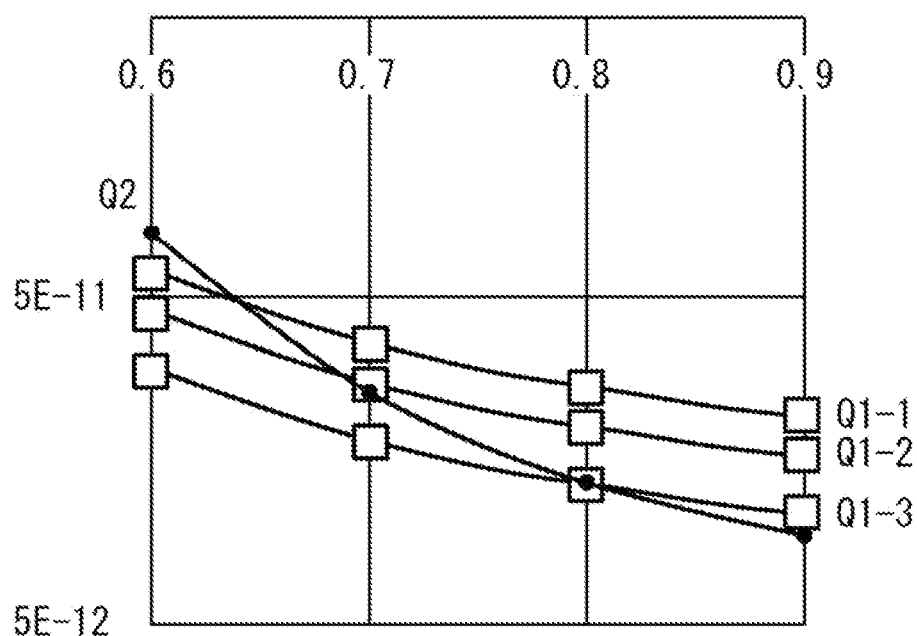
FIG. 18 is a diagram illustrating a relationship between delay amounts and a power supply voltage.

FIG. 18 is a graph illustrating a relationship between the delay amount in the delay circuit 4111-1, the delay amount in the delay circuit 4111-2, the delay amount in the delay circuit 4111-3, and the delay amount in the delay circuit 4112, and the power supply voltage. The graph shows the results of simulations performed by the inventors.

The vertical axis represents the delay amount(s), and the delay amount is larger toward the upper side. The horizontal axis represents the power supply voltage, and the power supply voltage is higher toward the right side. The delay amounts of the delay signals Q1-1 to Q1-3 are represented by square symbols, and the delay amount of the delay signal Q2 is represented by circular symbols.

When the power supply voltage is high, the delay amounts of the delay signals Q1-1 to Q1-3 are larger. When the power supply voltage is low, the delay amount of the delay signal Q2 is larger. In addition, the delay amount of the delay signal Q1-1 is larger than the delay amount of the delay signal Q1-2, and the delay amount of the delay signal Q1-2 is larger than the delay amount of the delay signal Q1-3.

A cross point of a curve representing the delay amount of the delay signal Q1-1 and a curve representing the delay amount of the delay signal Q2 is referred to as P1. A cross point of a curve representing the delay amount of the delay signal Q1-2 and the curve representing the delay amount of the delay signal Q2 is referred to as P2. A cross point of a curve representing the delay amount of the delay signal Q1-3 and the curve representing the delay amount of the delay signal Q2 is referred to as P3. P1 is located on the left side of P2, and P2 is located on the left side of P3.

Next, a method of determining the assist amount using the second embodiment will be described. The level of the mode signal MODE1 output from the delay determination memory 412-1 is "1" when the delay amount of the delay signal Q1-1 is smaller than the delay amount of the delay signal Q2, and is "0" otherwise. The level of the mode signal MODE2 output from the delay determination memory 412-2 is "1" when the delay amount of the delay signal Q1-2 is smaller than the delay amount of the delay signal Q2, and is "0" otherwise. The level of the mode signal MODE3 output from the delay determination memory 412-3 is "1" when the delay amount of the delay signal Q1-3 is smaller than the delay amount of the delay signal Q2, and is "0" otherwise.

When the power supply voltage is 0.6 V, the level of the mode signal MODE1 is "1", the level of the mode signal MODE2 is "1", and the level of the mode signal MODE3 is "1". In this case, the assist amount is set to "large", that is, the largest value. When the power supply voltage is 0.65 V, the level of the mode signal MODE1 is "0", the level of the mode signal MODE2 is "1", and the level of the mode signal MODE3 is "1". In this case, the assist amount is set to "middle", that is, the second largest value. When the power supply voltage is 0.75 V, the level of the mode signal MODE1 is "0", the level of the mode signal MODE2 is "0", and the level of the mode signal MODE3 is "1". In this case, the assist amount is set to "small", that is, the third largest value. When the power supply voltage is 0.9 V, the level of the mode signal MODE1 is "0", the level of the mode signal MODE2 is "0", and the level of the mode signal MODE3 is "0". In this case, the assist amount is set to "smallest", that is, the smallest value.

The first delay circuit according to the second embodiment includes a plurality of delay circuits having different numbers of stages of NOT circuits. In this case, since a plurality of mode signals can be generated, the operations of the SRAM macros can be controlled more precisely. In a case where the second delay circuit includes a plurality of delay circuits having different numbers of stages of NOT circuits, a similar effect is obtained.

Third Embodiment

A semiconductor chip according to a third embodiment includes a process monitor in addition to the voltage monitor described above. An assist circuit performs a read assist operation and a write assist operation based on a result of the process monitor.

Figure 19:
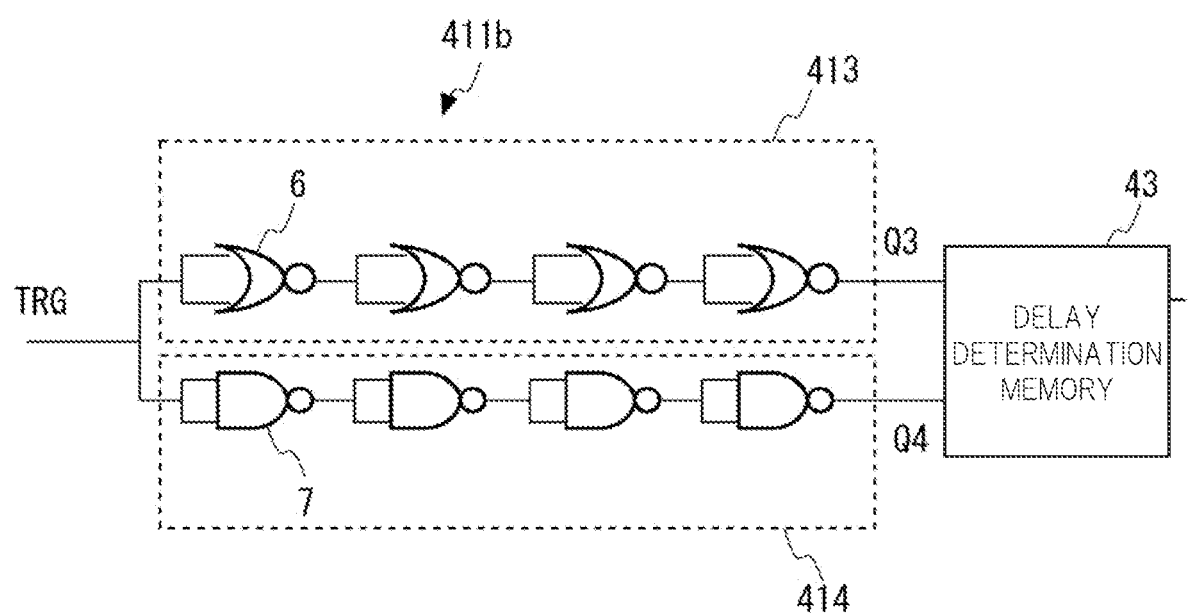
FIG. 19 is a diagram illustrating a configuration of a process monitor according to a third embodiment.

FIG. 19 is a diagram illustrating a configuration of the process monitor 411b according to the third embodiment. The process monitor 411b includes a delay circuit 413 and a delay circuit 414. The delay circuit 413 is also referred to as a third delay circuit. The delay circuit 414 is also referred to as a fourth delay circuit.

The delay circuit 413 includes NOR gates 6 at even-numbered stages (for example, four stages). Two inputs of each of the NOR gates 6 are connected, and each of the NOR gates 6 operates as a NOT circuit. The delay circuit 413 outputs a delay signal Q3 obtained by delaying a trigger signal TRG. The delay signal Q3 is input to a delay determination memory 43. The delay determination memory 43 is also referred to as a second delay determination memory. The delay determination memory 43 is configured similarly to the delay determination memory 412.

The delay circuit 414 includes NAND gates 7 at even-numbered stages (for example, four stages). Two inputs of each of the NAND gates 7 are connected, and each of the NAND gates 7 operates as a NOT circuit. The delay circuit 414 outputs a delay signal Q4 obtained by delaying the trigger signal TRG. The delay signal Q4 is input to the delay determination memory 43. The process monitor 411b and the delay determination memory 43 are provided in a determination block 41.

Each of the delay circuit 413 and the delay circuit 414 includes NOT circuits at four stages, but the NOR gates 6 are different from the NAND gates 7 in the number of stages of pMOS transistors and the number of stages of nMOS transistors. Therefore, the delay amount in the delay circuit 413 can be designed to be larger than the delay amount in the delay circuit 414 in a fast-slow (FS) process corner, and the delay amount in the delay circuit 413 can be designed to be smaller than the delay amount in the delay circuit 414 in a slow-fast (SF) process corner.

Figure 20:
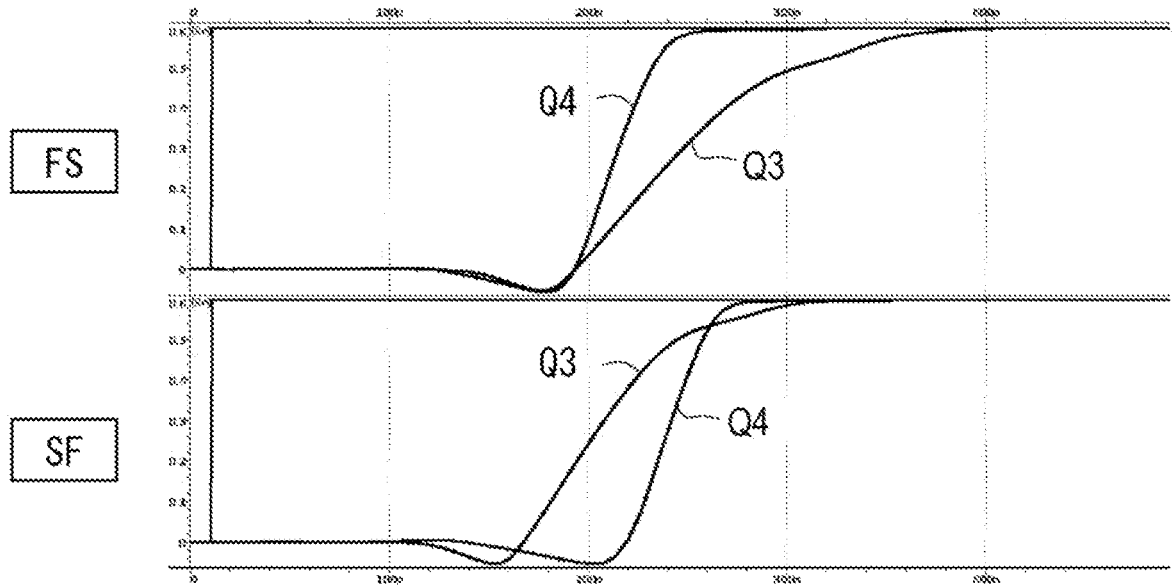
FIG. 20 is a diagram illustrating a relationship between delay amounts in an FS process corner and delay amounts in an SF process corner.

The upper part of FIG. 20 is a graph illustrating the delay signal Q3 and the delay signal Q4 in the FS process corner. The vertical axis represents the voltage, and the horizontal axis represents time. The graph is a simulation result in a case where the power supply voltage is 0.6 V and the temperature is −40° C. In the FS process corner, the delay amount of the delay signal Q3 is larger than the delay amount of the delay signal Q4.

The lower part of FIG. 20 is a graph illustrating the delay signal Q3 and the delay signal Q4 in the SF process corner. The vertical axis represents the voltage, and the horizontal axis represents time. The graph is a simulation result in a case where the power supply voltage is 0.6 V and the temperature is −40° C. In the SF process corner, the delay amount of the delay signal Q4 is larger than the delay amount of the delay signal Q3.

Meanwhile, it is known that write disturb is likely to occur in the FS process corner and read disturb is likely to occur in the SF process corner.

The delay determination memory 43 determines the completion of a process based on a magnitude relationship between the delay amount of the delay signal Q3 and the delay amount of the delay signal Q4, and holds a result of the determination. For example, when the delay amount of the delay signal Q3 is larger than the delay amount of the delay signal Q4, the delay determination memory 43 determines that it is the FS process corner, and otherwise, determines that it is the SF process corner. The delay determination memory 43 supplies the result of the determination to the assist circuit 21. The assist circuit 21 performs a read assist operation and a write assist operation further based on the completion of the process. Specifically, the assist circuit 21 applies only the write assist or increases the write assist amount in the FS process corner. The assist circuit 21 applies only the read assist or increases the read assist amount in the SF process corner.

In the semiconductor chip according to the third embodiment, the assist amount can be automatically adjusted based on the result of the process monitor.

Modification of Third Embodiment

Figure 21:
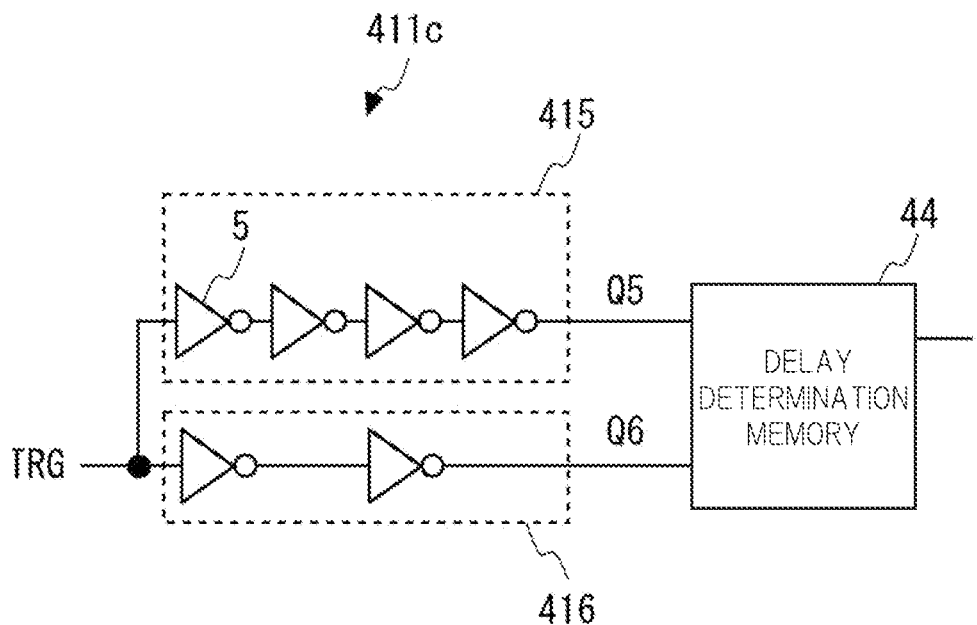
FIG. 21 is a diagram illustrating a configuration of a temperature monitor according to the third embodiment.

In a modification of the third embodiment, a delay circuit is used as a temperature monitor. FIG. 21 is a diagram illustrating a configuration of the temperature monitor 411c according to the modification. The temperature monitor 411c includes delay circuits 415 and 416. The delay circuit 415 is also referred to as a fifth delay circuit. The delay circuit 416 is also referred to as a sixth delay circuit.

Each of the delay circuit 415 and the delay circuit 416 includes NOT circuits 5 at even-numbered stages. A trigger signal TRG is input to the delay circuit 415 and the delay circuit 416. The delay circuit 415 outputs a delay signal Q5 obtained by delaying the trigger signal TRG. The delay circuit 416 outputs a delay signal Q6 obtained by delaying the trigger signal TRG. The delay signals Q5 and Q6 are input to a delay determination memory 44. The delay determination memory 44 is configured similarly to the delay determination memory 412.

The number of stages (for example, 4 stages) of the NOT circuits 5 included in the delay circuit 415 is larger than the number of stages of the NOT circuits 5 included in the delay circuit 416.

In the first embodiment, the sensitivity to temperature can be adjusted based on the threshold voltages, the channel widths, the channel lengths, and the like of the transistors, and the transistors are designed to suppress dependence on temperature, thereby being used as voltage monitors. However, on the contrary, it is also possible to design the devices to have a size such that the devices are dependent on temperature. In this case, since a magnitude relationship between the delay amounts of the delay signals Q5 and Q6 is reversed due to a change in temperature, the delay circuits can be used as the temperature monitor. When the temperature of the SRAM macro is higher than a predetermined temperature, the delay amount in the delay circuit 415 is larger than the delay amount in the delay circuit 416. Otherwise, the delay amount in the delay circuit 415 can be designed to be equal to or smaller than the delay amount in the delay circuit 416. The channel length and the channel width of the transistor in the fifth delay circuit are designed such that the fifth delay circuit (delay amount) is dependent on the temperature of the SRAM macro.

The delay determination memory 44 determines the temperature of the SRAM macro based on the magnitude relationship between the delay amount of the delay signal Q5 and the delay amount of the delay signal Q6, and holds the determination result. For example, in a case where the delay amount of the delay signal Q5 is larger than the delay amount of the delay signal Q6, the delay determination memory 44 determines that the temperature is higher than the predetermined temperature. The delay determination memory 44 supplies the determination result to the assist circuit 21. The assist circuit 21 performs a read assist operation and a write assist operation further based on the temperature. Specifically, the assist circuit 21 may increase the assist amounts when the temperature is higher than a predetermined temperature.

In the semiconductor chip according to the modification, the assist amounts can be automatically adjusted based on the temperatures of the SRAM macros. The semiconductor chip may automatically adjust the assist amounts based on the process corners and the temperature of the chip.

Fourth Embodiment

Figure 22:
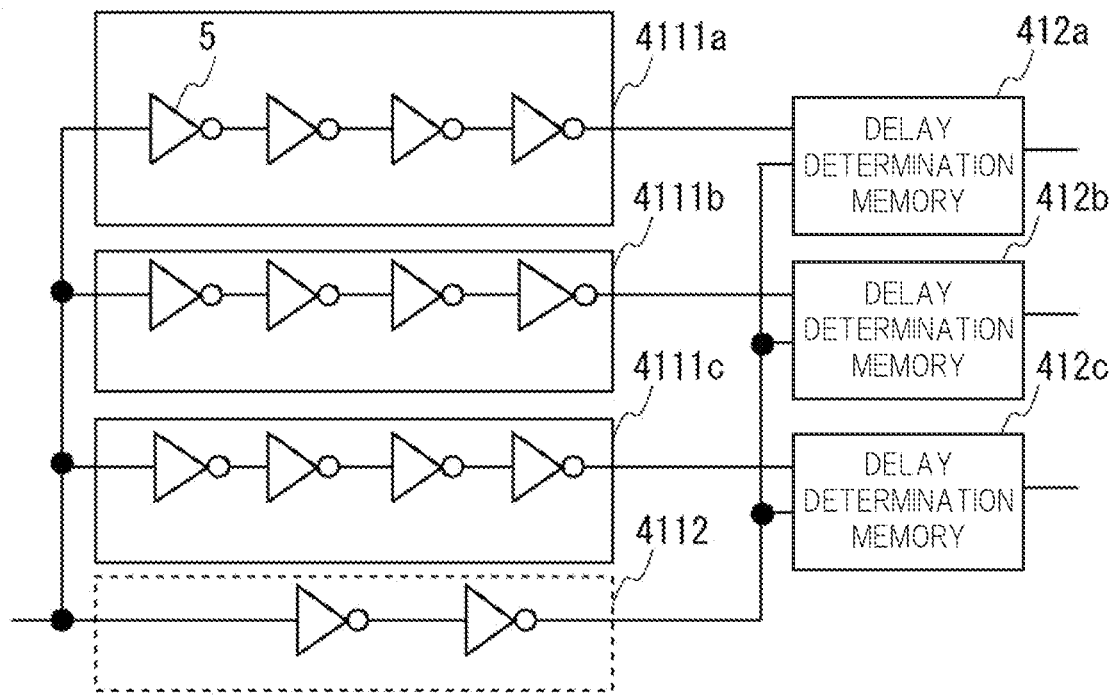
FIG. 22 is a diagram illustrating a configuration for reducing an effect of local variations according to a fourth embodiment.

A fourth embodiment is a modification of the first embodiment. FIG. 22 is a diagram illustrating a configuration of a determination block 41d according to the fourth embodiment. In the fourth embodiment, at least one of the first delay circuit and the second delay circuit is made redundant. A case where first delay circuits are made redundant will be mainly described below.

The determination block 41d includes a delay circuit 4111a, a delay circuit 4111b, a delay circuit 4111c, a delay circuit 4112, a delay determination memory 412a, a delay determination memory 412b, and a delay determination memory 412c.

Each of the delay circuit 4111a, the delay circuit 4111b, and the delay circuit 4111c includes NOT circuits 5 at four stages. The delay circuits 4111a, 4111b, and 4111c have the same configuration and are redundant circuits. Each of the delay circuits 4111a, 4111b, and 4111c includes low threshold voltage transistors.

The delay circuit 4112 includes NOT circuits 5 at two stages. The delay circuit 4112 includes high threshold voltage transistors.

The delay determination memory 412a generates a mode signal based on a magnitude relationship between the delay amount in the delay circuit 4111a and the delay amount in the delay circuit 4112. The delay determination memory 412b generates a mode signal based on a magnitude relationship between the delay amount in the delay circuit 4111b and the delay amount in the delay circuit 4112. The delay determination memory 412c generates a mode signal based on a magnitude relationship between the delay amount in the delay circuit 4111c and the delay amount in the delay circuit 4112. Since the delay circuits 4111a to 4111c have the same configuration, the delay determination memories 412a to 412c generate the same mode signal in a case where there is no local variation.

Each of the delay circuits 4111a to 4111c includes the same type of low threshold voltage transistors. However, a threshold voltage in the delay circuit 4111a, a threshold voltage in the delay circuit 4111b, and a threshold voltage in the delay circuit 4111c may be different due to local variations.

In the fourth embodiment, the mode signal is generated based on the delay amount in the delay circuit having a small deviation of the threshold voltage due to local variations among the delay circuits 4111a to 4111c. For example, in a case where the deviation of the threshold voltage in the delay circuit 4111a is small, the assist operation is performed using the mode signal generated by the delay determination memory 412a.

For example, in the test stage of the semiconductor chip, it is determined in which delay circuit among the delay circuits 4111a to 4111c the deviation of the threshold voltage is small. Then, among the delay determination memories 412a to 412c, only the mode signal generated by the delay determination memory corresponding to the delay circuit having the small deviation of the threshold voltage may be set valid.

Note that second delay circuits may be made redundant. In a case where the second delay circuits are made redundant, the mode signal is generated based on the delay amount in the second delay circuit having a small deviation of the threshold voltage due to local variations among the plurality of second delay circuits made redundant.

According to the fourth embodiment, it is possible to reduce an effect of local variations in generation of a mode signal.

Although the invention made by the present inventors has been specifically described based on the embodiments, the present invention is not limited to the above embodiments, and it goes without saying that various modifications can be made without departing from the gist of the present invention.

For example, the voltage dividing circuits according to the above embodiments may have a configuration in which the conductivity type (p-type or n-type) of a semiconductor substrate, a semiconductor layer, a diffusion layer (diffusion region), or the like is inverted. Therefore, in a case where one of the n-type and the p-type conductivity types is a first conductivity type and the other conductivity type is a second conductivity type, the first conductivity type can be the p-type and the second conductivity type can be the n-type, and conversely, the first conductivity type can be the n-type and the second conductivity type can be the p-type.

What is claimed is:

1. A semiconductor chip on which a plurality of static random access memory (SRAM) macros each including a memory cell array, an input/output circuit, a word line driver, and a control circuit are mounted,
   wherein each of the SRAM macros includes:
      a determination block disposed in the control circuit and configured to generate a mode signal for determining a read assist amount and a write assist amount based on a power supply voltage of the SRAM macro; and
      an assist circuit configured to perform a read assist operation and a write assist operation based on the mode signal generated by the determination block,
   wherein the determination block includes:
      a first delay circuit and a second delay circuit each including NOT circuits at even-numbered stages; and
      a first delay determination memory that generates the mode signal based on a magnitude relationship between a delay amount in the first delay circuit and a delay amount in the second delay circuit and holds the mode signal,
   wherein the number of stages of the NOT circuits included in the first delay circuit is larger than the number of stages of the NOT circuits included in the second delay circuit, and
   wherein a threshold voltage of a transistor forming the first delay circuit is lower than a threshold voltage of a transistor forming the second delay circuit.

2. The semiconductor chip according to claim 1,
   wherein at least one of the first delay circuit and the second delay circuit includes a plurality of delay circuits having different numbers of stages of the NOT circuits.

3. The semiconductor chip according to claim 1,
   wherein the determination block further includes:
      a third delay circuit including a NAND circuit and a fourth delay circuit including a NOR circuit; and
      a second delay determination memory that determines completion of a process based on a magnitude relationship between a delay amount in the third delay circuit and a delay amount in the fourth delay circuit and holds a result of the determination, and
   wherein the assist circuit performs the read assist operation and the write assist operation further based on the completion of the process.

4. The semiconductor chip according to claim 1,
   wherein the determination block includes:
      a fifth delay circuit and a sixth delay circuit each including NOT circuits at even-numbered stages; and
      a third delay determination memory that determines a temperature of the SRAM macro based on a magnitude relationship between a delay amount in the fifth delay circuit and a delay amount in the sixth delay circuit, wherein the number of stages of the NOT circuits included in the fifth delay circuit is larger than the number of stages of the NOT circuits included in the sixth delay circuit, wherein a channel length and a channel width of a transistor in the fifth delay circuit are designed such that the fifth delay circuit is dependent on temperature, and wherein the assist circuit performs the read assist operation and the write assist operation further based on the temperature of the SRAM macro.

5. The semiconductor chip according to claim 1, wherein at least one of the first delay circuit and the second delay circuit is made redundant, and wherein in a case where the first delay circuit is made redundant, the mode signal is generated based on a delay amount in a first delay circuit having a small deviation of the threshold voltage due to a local variation among a plurality of first delay circuits made redundant, and in a case where the second delay circuit is made redundant, the mode signal is generated based on a delay amount in a second delay circuit having a small deviation of the threshold voltage due to a local variation among a plurality of second delay circuits made redundant.

* * * * *